United States Patent [19]
Jessen

[11] Patent Number: 5,954,499
[45] Date of Patent: Sep. 21, 1999

[54] PLANT AND METHOD FOR MANUFACTURING CEMENT CLINKER

[75] Inventor: Ejnar Jessen, Valby, Denmark

[73] Assignee: F. L. Smidth & Co. A/S, Denmark

[21] Appl. No.: 09/150,648

[22] Filed: Sep. 2, 1998

Related U.S. Application Data

[63] Continuation of application No. PCT/DK97/00049, Feb. 7, 1997.

[30] Foreign Application Priority Data

Mar. 6, 1996 [DK] Denmark ................................. 0260/96

[51] Int. Cl.⁶ ..................................................... F27B 15/00
[52] U.S. Cl. ................................ 432/106; 432/14; 432/58
[58] Field of Search ................................ 432/13, 14, 58, 432/106; 106/744, 745, 757; 110/245

[56] References Cited

U.S. PATENT DOCUMENTS

| | | | |
|---|---|---|---|
| 4,017,253 | 4/1977 | Wielang et al. | 432/58 |
| 4,058,069 | 11/1977 | Baing et al. | 432/15 |
| 4,353,750 | 10/1982 | Quittkat | 432/14 |
| 4,527,973 | 7/1985 | Kondoh et al. | 432/58 |
| 5,800,610 | 9/1998 | Jons | 432/14 |

FOREIGN PATENT DOCUMENTS 0162215  11/1985  European Pat. Off. .

*Primary Examiner*—Teresa Walberg
*Assistant Examiner*—Gregory A. Wilson
*Attorney, Agent, or Firm*—Baker & Botts, L.L.P.

[57] ABSTRACT

The present invention relates to a plant for manufacturing cement clinker. The plant consists of a preheater, a calciner in which the raw material is calcined at a temperature of more than 800° C. and where fuel and oxygen-containing gas are fed to the lowermost zone of the calciner, and a kiln. The object of the invention is to provide a plant for manufacturing cement in which it is possible to burn lumpy fuel in a calciner, while simultaneously maintaining the possibility of increasing the time of retention and possibly the temperature of the material being fed to the lowermost zone in the calciner. This object is achieved according to the invention in that the calciner is provided with a fixed bottom (27) allowing combustible material fed to the calciner to be deposited on the bottom and in that oxygen-containing gas is fed horizontally to the calciner through openings in the lowermost zone of the calciner. That the oxygen-containing gas is fed horizontally entails that the gas is introduced through the vertical sides/walls of the calciner, and not through the bottom.

16 Claims, 4 Drawing Sheets

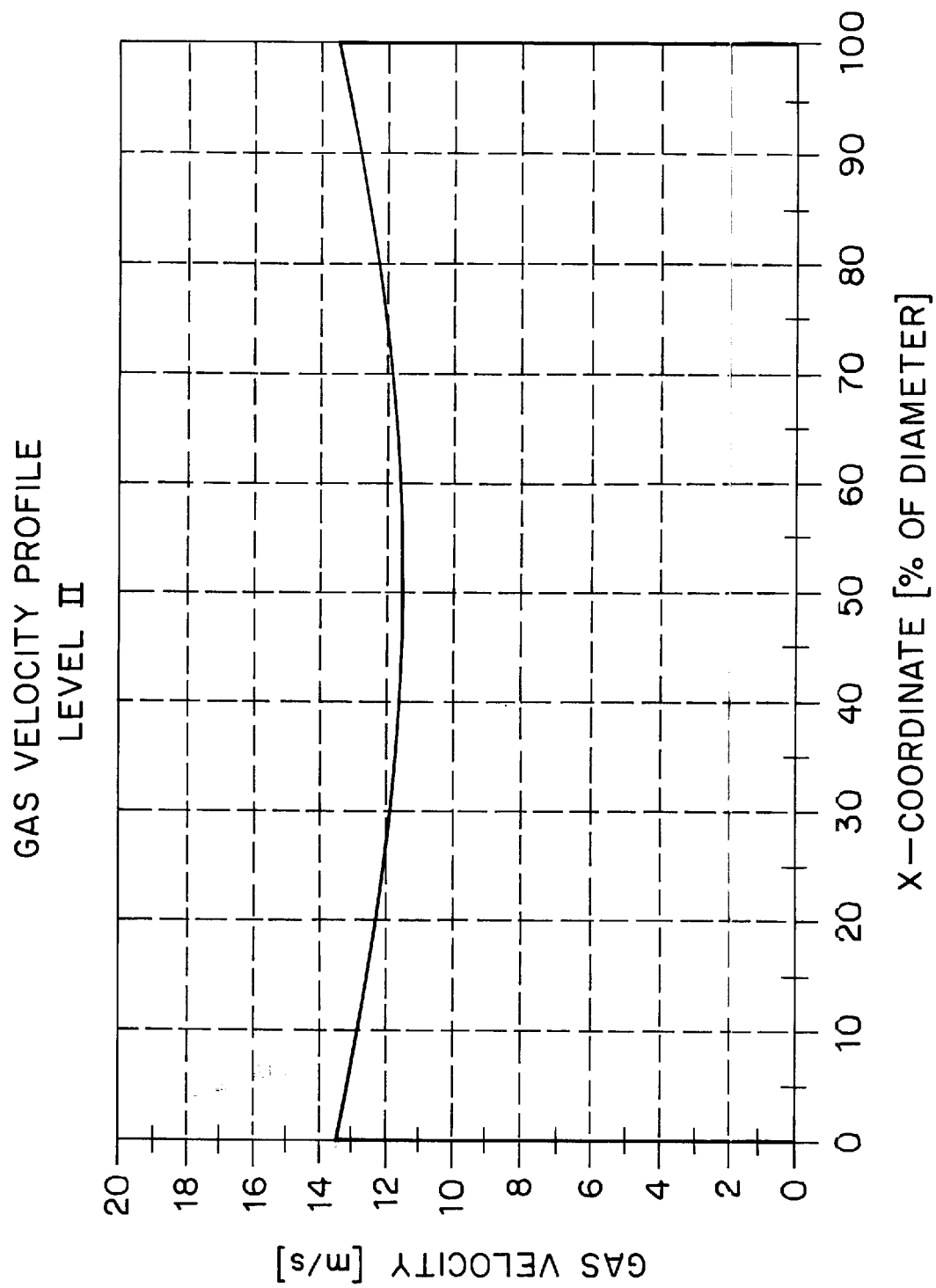

PLANT AND METHOD FOR MANUFACTURING CEMENT CLINKER

This is a continuation of application Ser. No. PCT/DK97/00049 filed Feb. 7 1997.

BACKGROUND OF THE INVENTION

The present invention relates to a plane for manufacturing cement clinker. The plant consists of a preheater in which the raw materials are preheated, a calciner in which the raw material is calcined at a temperature of more than 800° C. and where fuel and oxygen-containing gas are fed to the lowermost zone of the calciner, and a kiln in which the raw materials are burned and transformed into clinker.

In a conventional plant for manufacturing cement clinker it will be possible to substitute up to 20% of the primary fuel in a rotary kiln by low-cost waste fuel, such as rubber tyres, without sacrificing the quality of the finished cement product.

Normally, a maximum of 40% of the total fuel requirement of the cement plant is fired in the clinker kiln, with the remaining 60% being fired in the calciner. As a consequence hereof, in an ordinary kiln plant it will only be possible to substitute about 20% of the 40% fuel which is fired in the rotary kiln, i.e. approximately 8% of the total fuel rate, by waste fuel. Therefore, it would be advantageous if a greater part of the fuel burned in the calciner could be substituted by waste fuel.

However, there are certain limitations to the types of waste which can be advantageously burned in the calciner.

The temperature in the calciner will typically be within the range 850–950° C., which means that there will not be any advantage in burning hazardous waste, the harmful substances of which have to be decomposed and neutralized during combustion, since this would require higher temperatures and a longer retention time than is available in the calciner.

Calciners are normally of the suspension type, which entails that the preheated air from the clinker cooler or from the kiln is carried via a duct and a flexible pipe bend up to the bottom of the calciner. If lumpy waste such as shredded rubber tyres is fed to the calciner, it will drop down into the pipe bend, causing it to be blocked. As a consequence hereof, calciners with a bottom being configured in this manner are not suitable for firing lumpy fuels.

It may also be difficult to utilize fuel which is difficult to ignite, e.g. certain coal types with a low content of volatile compounds, since the retention time in the calciner is relatively short and the temperature relatively low.

In Danish patent application No. 870/82 (Metallgesellschaft AG) is shown a fluid-bed calciner in which oxygen-containing fluidizing air is fed through the bottom of the calciner and where, furthermore, oxygen-containing secondary air can be fed horizontally to an area which extends from minimum 1 metre above the entry point of the fluidizing air and up to the lowermost 30% of the calciner. In this system at least 65% of the fuel which is used to cover the total heat requirement is fed to the calciner and at least 10% of the fuel is fed to the subsequent kiln. By generating a fluid bed in the calciner it is possible to achieve a high degree of calcination, even in case of variations in respect of particle size distribution. However, the fluidization means that a substantial amount of false air is introduced to the system, and this will have an adverse effect on the heat economy. The actual injection of the fluidizing air also requires a certain input of energy.

From Danish patent No. 170368 (F.L. Smidth & Co. A/S) it is known practice to feed lumpy material such as shredded automobile tyres to a decomposition chamber which is installed in connection with the calciner. According to this patent specification preheated or partially calcined raw meal is fed to the decomposition chamber so as to heat up the waste fuel. The temperature which it is desirable to achieve in the decomposition chamber must be sufficiently high to ensure that a pyrolysis process is carried out, but, on the other hand, it must not be so high as to result in granulation of the raw meal. The combustible gases from the decomposition chamber subsequently flow into the burning chamber which consists of the calciner itself, and the residual products are extracted from the bottom of the decomposition chamber and may be conveyed to the rotary kiln. However, the use of a decomposition chamber, in which an air deficit is being applied, will not allow the same amount of energy to be extracted from the waste in the calciner as can be obtained in connection with a complete combustion under conditions of sufficient oxygen supply.

SUMMARY OF THE INVENTION

It is the object of the invention to provide a plant for manufacturing cement in which it is possible to burn lumpy fuel in a calciner, while simultaneously maintaining the possibility of increasing the time of retention and possibly the temperature of the material being fed to the lowermost zone in the calciner.

This object is achieved according to the invention in that the calciner is provided with a fixed bottom thereby allowing combustible material fed to the calciner to be deposited on the bottom and in that oxygen-containing gas is fed horizontally to the calciner through openings in the lowermost zone of the calciner. That the oxygen-containing gas is fed horizontally entails that the gas is introduced through the vertical sides/walls of the calciner, and not through the bottom.

So, by feeding combustible material and oxygen-containing air it will thus be possible to generate a burning chamber in the lowermost zone in the calciner in which the temperature exceeds that prevailing in the remaining part of the calciner, with the temperature being maintained preferably within the range 1100–1300° C. It is a particular advantage of this burning chamber that there are no requirements in regard to the fuel being fed. Neither in regard to the size of any lumpy fuel, the consistency of the fuel, nor the calorific value and residual content of the fuel.

Also, a modification of an existing plant will be relatively simple to carry out since it will only be necessary to modify the bottom of the calciner and the air supply system.

In order to control the temperature in the lowermost zone it is essential to ensure that the input of raw meal can be controlled, since the input of large amounts of raw meal will lower the temperature due to the fact that calcination is an endothermal process.

In order to ensure a controlled input of raw meal to the lowermost zone it is essential to ensure that the raw meal being fed to the uppermost zone in the calciner does not fall through to the lowermost zone.

Any such fall-through of raw meal can be appropriately prevented by ensuring that the velocity profile of the upward-flowing air in the uppermost part of the lower zone of the calciner is positive and relatively uniform.

There are numerous ways in which to ensure a positive velocity profile across the entire cross-section of the lowermost zone. A simple method is to ensure that the oxygen-containing gas flows into the lowermost zone in such a way that downward directed flows in the cross-section do not occur.

In a particular appropriate embodiment of the invention in which the oxygen-containing gas is introduced and distributed in an appropriate manner, the side/sides in the lowermost zone of the calciner is/are provided with several smaller openings, all of which being fed with oxygen-containing hot gas from an annular chamber. In this scenario, the annular chamber will only need to be equipped with one single hot gas supply point.

BRIEF DESCRIPTION OF THE DRAWINGS

The invention will now be described in further details with reference to the drawing, where FIG. 5 shows the velocity profile of the gas in the combustion chamber 23 at the line II in FIG. 4,

DESCRIPTION OF THE PREFERRED EMBODIMENTS

Figure 1:
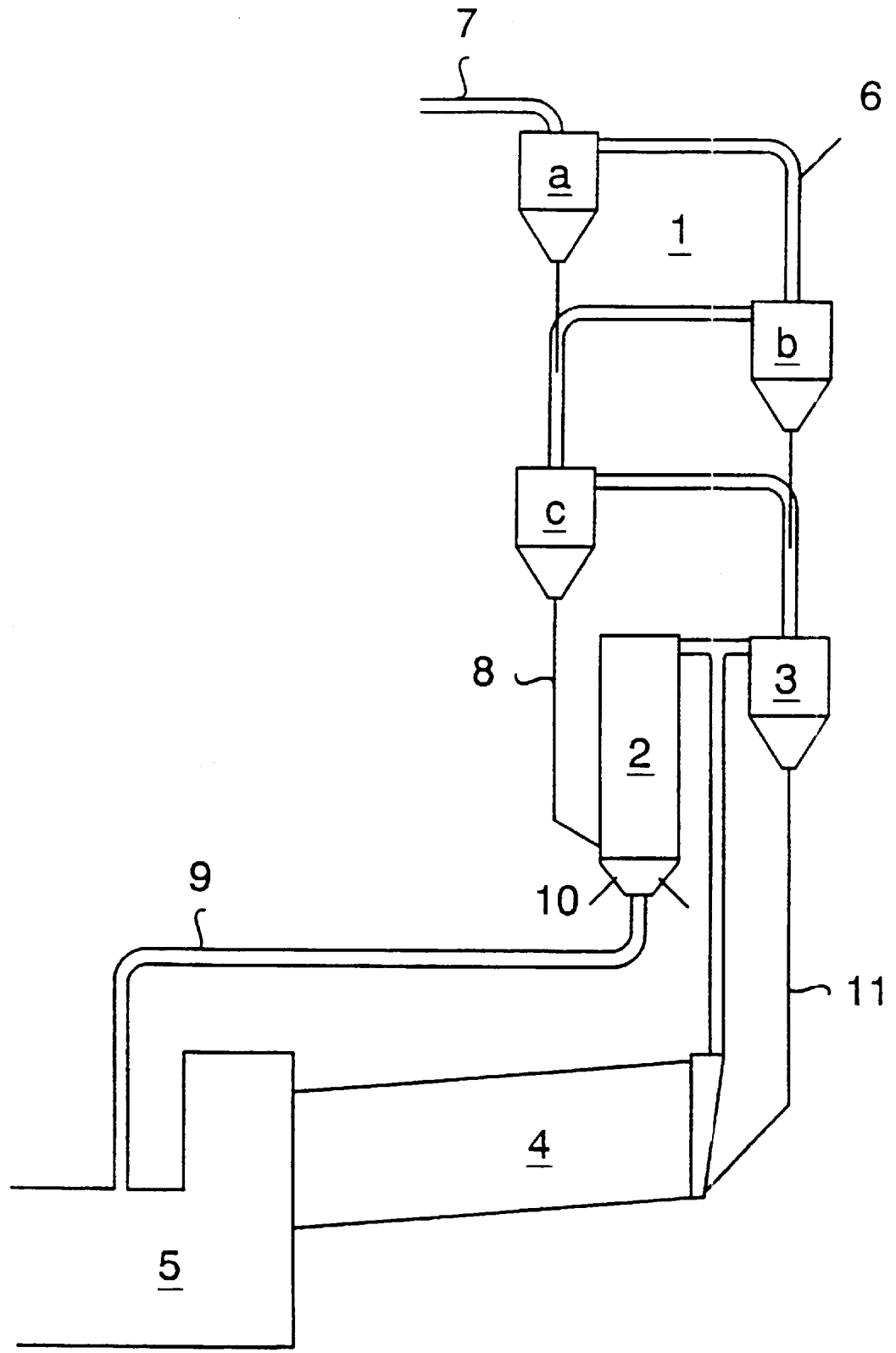
FIG. 1 shows a conventional plant for manufacturing cement.

In FIG. 1 is shown a generally known plant for manufacturing cement. This plant consists of a preheater 1 which consists of three preheater cyclones a, b and c, a calciner 2 subsequent to which is installed a separating cyclone 3, and a kiln 4 which is succeeded by a cooler 5.

The raw materials fall down through the plant in counterflow to the hot gas from the kiln 4 and from the cooler 5 which moves up through the calciner 2 and the preheater 1. The raw materials are thus introduced into the plant at the uppermost end of the preheater 1 via the duct 6. The raw materials are subsequently conveyed in suspension in a hot gas stream into the preheater cyclone a in which the material is separated from the suspension and directed via a duct down into an even hotter stream of gas which carries the raw material to preheater cyclone b. In similar manner the raw material is carried from cyclone b to cyclone c. The gas from which the raw material is separated in cyclone a is diverted via a duct 7 to an electrostatic precipitator and then vented to a stack.

Once the raw material has passed through the preheater 1, it is directed via a duct 8 to the calciner 2 and the preheated raw material is normally fed immediately above the bottom in the calciner.

The calciner 2 in FIG. 1 is of the SLC-type (Separate Line Calciner) and, therefore, it is only fed with oxygen-rich air from the cooler via a duct 9. A calciner of the ILC-type (In-LineCalciner) is fed with the hot air from the kiln together with hot oxygen-containing air from the cooler. In connection with a calciner of the SLC-type, the hot air from the kiln is bypassed around the calciner and fed directly to the preheater.

One or more burners 10 ensure that the temperature in the calciner is raised to a level of approximately 850–950° C. and after the raw meal has been calcined, it is carried in suspension across the separating cyclone 3 in which the calcined raw meal is separated from the suspension and directed via a duct 11 to the clinker kiln 4. The hot gas from the calciner 2 rises to exit at the top of the separating cyclone 3 and is passed on to the preheater 1. Finally, the calcined raw meal passes through the kiln 4 in which the raw meal is subjected to temperatures higher than 1400° C. As a result, a molten mass is generated in which the clinker minerals can be formed. The molten mass with the clinker minerals is nodulized, whereafter the finished clinker drops into the cooler where the clinker is cooled down to a level around 100° C.

Figure 2:
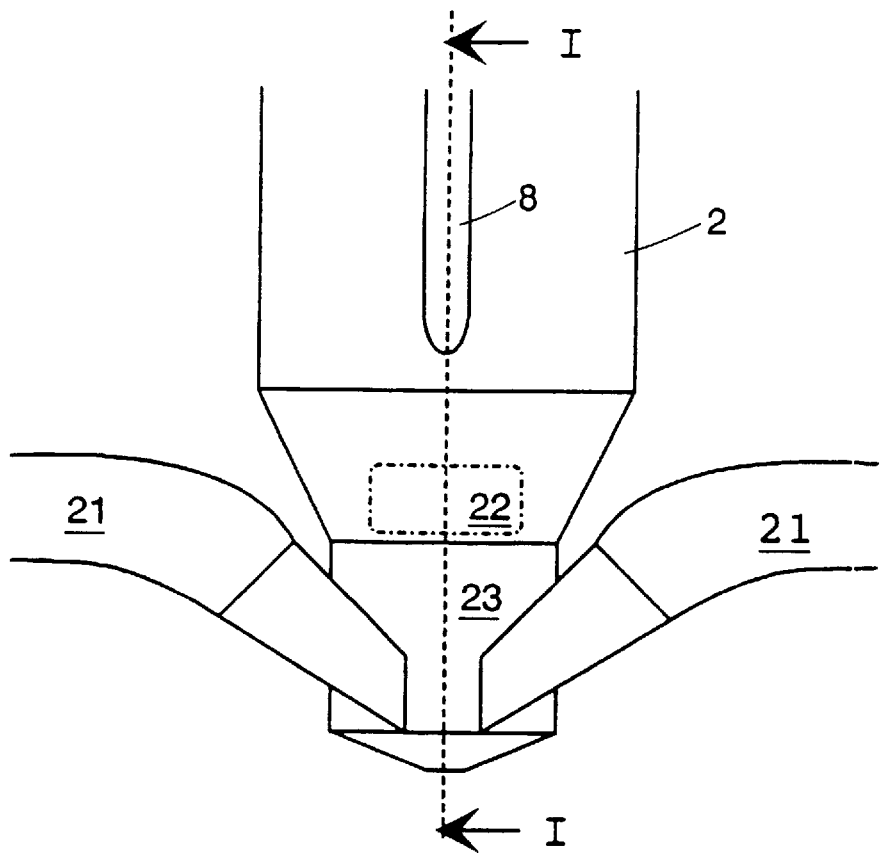
FIGS. 2 and 3 show an embodiment of a calciner in a plant according to the invention.
Figure 3:
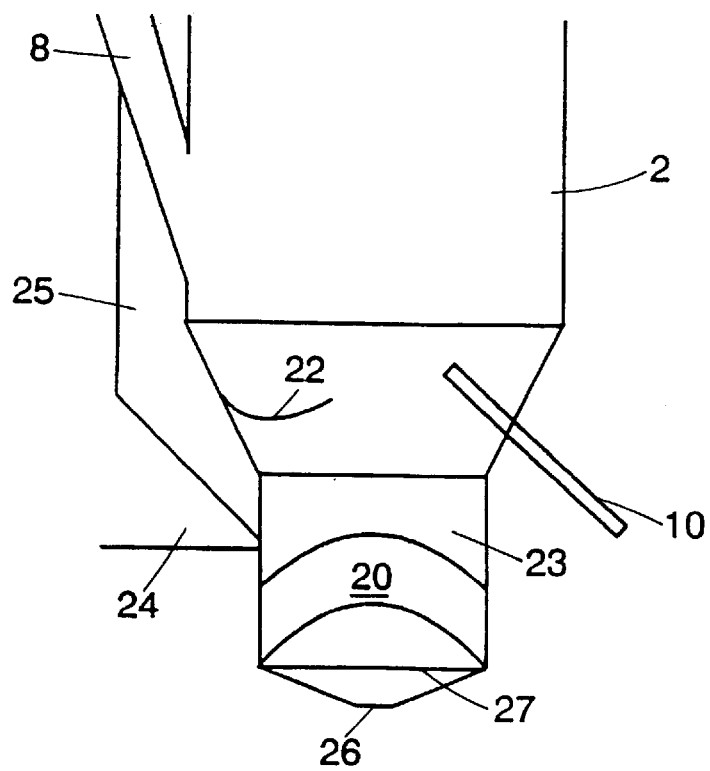

In FIGS. 2 and 3 is shown an embodiment of a calciner 2 for a plant according to the invention. In FIG. 3, the calciner 2 in FIG. 2 is thus cut through at the line I.

Hot gas is fed to the calciner 2 via two ducts 21 which direct the hot gas horizontally into the calciner 2 through two openings 20, one of which can be seen in FIG. 3. Raw meal is fed to the upper part of the calciner 2 via a duct 8 and a 'ski jump' 22 may be fitted under the duct 8 so as to prevent all of the raw meal from ending up in the lowermost zone of the calciner 2.

Efficient distribution of the raw meal across the cross-sectional area of the calciner, either by deploying a "ski jump" or by using another distribution mechanism which will ensure that the raw meal is properly suspended, will also minimize the pressure loss across this part of the calciner.

In the lowermost zone of the calciner is formed a burning chamber 23 which is fed with fuel via a duct 24 and the temperature in the burning chamber 23 can be controlled by adding a smaller amount of raw meal via the duct 25. Fuel to the upper zone of the calciner is supplied via one or more burners 10. A fixed bottom 27 is provided at the bottom of the burning chamber 23. The fact that the bottom is fixed means that the combustible material which is fed via the duct 24 is allowed to settle on the bottom, thereby generating a stationary fire. The bottom 27 may be configured so that any residual material can be removed, either through scraping, or by the material dropping through the bottom or being blown up into the suspension. In this embodiment an opening 26 for extracting residual material is fitted under the bottom 27.

Figure 4:
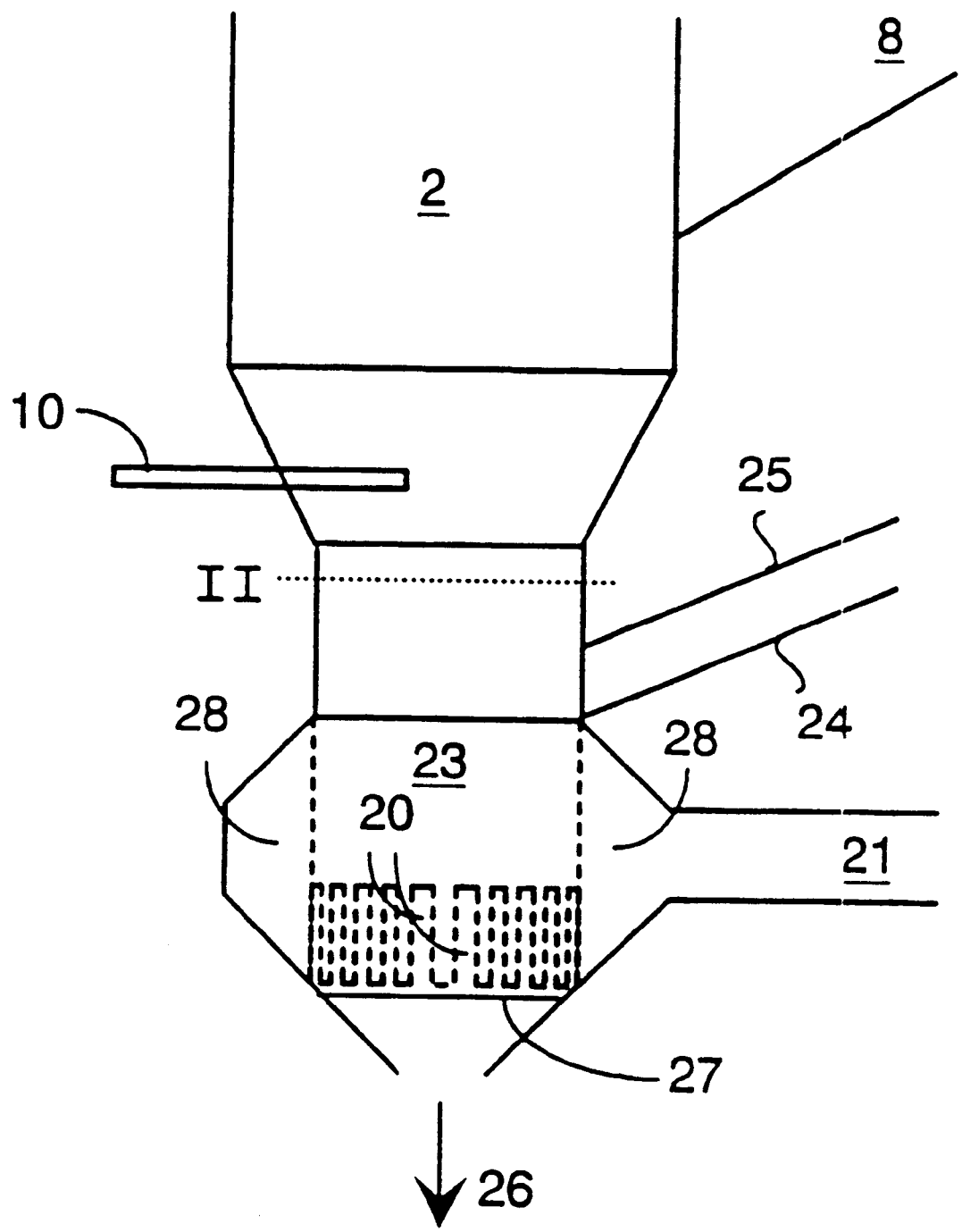
FIG. 4 shows a preferred embodiment of a calciner in a plant according to the invention.

In FIG. 4 is illustrated another embodiment of a calciner for a plant according to the invention. In this embodiment the lowermost zone of the calciner 2 is fed with hot gas through a duct 21 which via an annular chamber 28 distributes the hot gas through several openings 20 in the sides of the calciner.

In FIG. 5 is seen the velocity profile for the uppermost part of the lowermost zone in a plant similar to that shown in FIG. 4 at the line II in which the hot oxygen-containing gas is fed to the burning chamber 23 via an annular chamber 28.

As is apparent from the figure, the velocity is positive, i.e. ascending across the entire cross-sectional area. If the gas is made to rotate in the chamber, for example by feeding the gas tangentially, there is a risk of the velocity profile for the centremost zone becoming negative, i.e. with the velocity being downward-directed.

Also, in order to ensure the desired velocity profile and burning in the lowermost zone, the inner diameter of the upper part of the calciner may be 1.5–2 times that of the inner diameter of the lowermost zone.

I claim:

1. A plant for manufacturing cement clinker which comprises a preheater in which the cement raw meal is calcined at a temperature of more than 800° C. and where fuel as well as oxygen-containing gas are fed to a lowermost zone of the calciner, and a kiln in which the raw meal is burned and transformed into clinker and wherein the lowermost zone of the calciner is provided with a fixed bottom upon which lumpy fuel that is introduced into the lowermost zone of the calciner may be deposited and burned, means for introducing oxygen-containing gas horizontally to the lowermost zone and means for introducing a smaller, controlled amount of uncalcined raw meal to the lowermost zone in the calciner.

2. A plant according to claim 1 wherein the temperature in the lowermost zone in the calciner is higher than the temperature in the upper zone of the calciner.

3. A plant according to claim 1 or 2 wherein the temperature in the lowermost zone in the calciner is higher than 1000° C.

4. A plant according to claim 3 characterized in that the oxygen-containing gas is fed to the lowermost zone of the calciner through at least two openings in the side(s) of the calciner.

5. A plant according to claim 3 characterized in that the oxygen-containing gas is fed to the lowermost zone of the calciner through at least two openings in the side of the calciner, said openings being arranged so that a positive velocity profile is maintained for the upward-flowing gas stream in the upper part of the lowermost zone.

6. A plant according to claim 3 characterized in that the inner diameter of the upper part of the calciner is 1.5–2 times of the inner diameter of the lowermost zone.

7. A plant according to claim 1 wherein the temperature in the lowermost zone in the calciner is maintained within the range 1100–1300° C.

8. A plant according to claim 7 characterized in that the oxygen-containing gas is fed to the lowermost zone of the calciner through at least two openings in the side(s) of the calciner.

9. A plant according to claim 7 characterized in that the oxygen-containing gas is fed to the lowermost zone of the calciner through at least two openings in the side of the calciner, said openings being arranged so that a positive velocity profile is maintained for the upward-flowing gas stream in the upper part of the lowermost zone.

10. A plant according to claim 7 characterized in that the inner diameter of the upper part of the calciner is 1.5–2 times of the inner diameter of the lowermost zone.

11. A plant according to claim 1 wherein the oxygen-containing gas is fed to the lowermost zone of the calciner through at least two openings in the side(s) of the calciner.

12. A plant according to claim 11 characterized in that the oxygen-containing gas is fed to the lowermost zone of the calciner through at least two openings in the side of the calciner, said openings being arranged so that a positive velocity profile is maintained for the upward-flowing gas stream in the upper part of the lowermost zone.

13. A plant according to claim 11 characterized in that the inner diameter of the upper part of the calciner is 1.5–2 times of the inner diameter of the lowermost zone.

14. A plant according to claim 1 wherein the oxygen-containing gas is fed to the lowermost zone of the calciner through at least two openings in the side of the calciner, said openings being arranged so that a positive velocity profile is maintained for the upward-flowing gas stream in the upper part of the lowermost zone.

15. A plant according to claim 14 characterized in that the inner diameter of the upper part of the calciner is 1.5–2 times of the inner diameter of the lowermost zone.

16. A plant according to claim 1 wherein the inner diameter of the upper part of the calciner is 1.5–2 times that of the inner diameter of the lowermost zone.

* * * * *